United States Patent
Takemoto

(10) Patent No.: US 11,453,305 B2
(45) Date of Patent: Sep. 27, 2022

(54) VEHICLE CHARGE SYSTEM AND CHARGE CONTROL METHOD

(71) Applicant: TOYOTA JIDOSHA KABUSHIKI KAISHA, Toyota (JP)

(72) Inventor: Taiki Takemoto, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/288,663

(22) Filed: Feb. 28, 2019

(65) Prior Publication Data

US 2019/0291600 A1 Sep. 26, 2019

(30) Foreign Application Priority Data

Mar. 20, 2018 (JP) .............................. JP2018-052457

(51) Int. Cl.
*H02J 7/00* (2006.01)
*B60L 53/62* (2019.01)
*B60L 58/15* (2019.01)
*B60W 20/13* (2016.01)
*H02J 50/10* (2016.01)

(52) U.S. Cl.
CPC ............... *B60L 53/62* (2019.02); *B60L 58/15* (2019.02); *B60W 20/13* (2016.01); *H02J 7/007182* (2020.01); *B60W 2510/244* (2013.01); *H02J 50/10* (2016.02)

(58) Field of Classification Search
CPC ........ H02J 7/0048; H02J 7/0021; H02J 7/045; H02J 2007/0067; B60L 58/15; B60W 2510/244

USPC ....................................................... 320/132
See application file for complete search history.

(56) References Cited

U.S. PATENT DOCUMENTS

| 6,107,782 | A | * | 8/2000 | Imai ...................... H01M 10/44 320/150 |
| 6,118,250 | A | * | 9/2000 | Hutchison, IV ...... H02J 7/0071 320/110 |
| 8,368,347 | B2 | | 2/2013 | Mitsutani |
| 2012/0161792 | A1 | * | 6/2012 | Ikeda ................... G06K 9/0002 324/658 |

(Continued)

FOREIGN PATENT DOCUMENTS

| JP | 2017-127159 A | 7/2017 |
| WO | 2010/061465 A1 | 6/2010 |
| WO | 2016/189832 A1 | 12/2016 |

*Primary Examiner* — Arun C Williams
(74) *Attorney, Agent, or Firm* — Oliff PLC

(57) ABSTRACT

A vehicle charge system includes: a voltage detection section configured to detect terminal voltage of a storage battery; and a charge control section configured to control charging of the storage battery until the terminal voltage reaches full-charge voltage, while switching between a first charging mode and a second charging mode, on the basis of the terminal voltage. During a period in which the terminal voltage is equal to or lower than first voltage, the charge control section charges the storage battery by the first charging mode. After the terminal voltage has exceeded the first voltage, the charge control section charges the storage battery by the second charging mode. After the terminal voltage has exceeded the first voltage, if the terminal voltage has reduced to be second voltage, the charge control section charges the storage battery by the first charging mode until the terminal voltage is restored to the first voltage.

2 Claims, 4 Drawing Sheets

(56) References Cited

U.S. PATENT DOCUMENTS

| | | | |
|---|---|---|---|
| 2016/0006272 A1* | 1/2016 | Greening | H02J 7/00041 320/162 |
| 2016/0089994 A1* | 3/2016 | Keller | H02J 7/04 320/153 |
| 2018/0128880 A1 | 5/2018 | Miyamoto et al. | |
| 2020/0153255 A1* | 5/2020 | Inoue | H02J 7/0016 |

* cited by examiner

VEHICLE CHARGE SYSTEM AND CHARGE CONTROL METHOD

BACKGROUND OF THE INVENTION

Field of the Invention

The present invention relates to a charge system for charging a storage battery provided to a vehicle, and a charge control method executed by the charge system.

Description of the Background Art

International Publication No. 2010/061465 (hereinafter, Patent Literature 1) discloses a charge system for performing plug-in charging of a storage battery from a power supply outside a vehicle. In this charge system, charging is performed at high speed with constant current until the storage battery reaches a predetermined highly charged state, and then, after the storage battery has reached the highly charged state, the charging is switched to gradual charging with constant power until the storage battery reaches a fully charged state. Thus, effective charging is achieved while an overcharged state is avoided.

In the charge method disclosed in Patent Literature 1, in such a case where an auxiliary device or the like is connected to a storage battery to be charged, if the charge amount of the storage battery decreases due to power consumption or the like by the auxiliary device during a period in which gradual charging is being performed after quick charging of the storage battery has been completed, the charging period until the storage battery reaches a fully charged state is prolonged.

SUMMARY OF THE INVENTION

The present invention has been made in view of the above problem, and an object of the present invention is to provide a vehicle charge system and a charge control method that can prevent prolonging of the charging period until the storage battery reaches a fully charged state.

In order to achieve the above object, one aspect of the present invention is a vehicle charge system for charging a storage battery, the vehicle charge system including: a voltage detection section configured to detect terminal voltage of the storage battery; and a charge control section configured to control charging of the storage battery until the terminal voltage of the storage battery reaches full-charge voltage, while switching between a first charging mode in which the charging is performed at a predetermined charging speed and a second charging mode in which the charging is performed at a predetermined charging speed slower than the first charging mode, on the basis of the terminal voltage of the storage battery. After the charging is started, during a period in which the terminal voltage of the storage battery is equal to or lower than predetermined first voltage which is lower than the full-charge voltage, the charge control section charges the storage battery by the first charging mode. After the terminal voltage of the storage battery has exceeded the first voltage, the charge control section charges the storage battery by the second charging mode. After the terminal voltage of the storage battery has exceeded the first voltage, if the terminal voltage of the storage battery has reduced to be equal to or lower than predetermined second voltage which is equal to or lower than the first voltage, the charge control section charges the storage battery by the first charging mode until the terminal voltage of the storage battery is restored to the first voltage.

In the vehicle charge system according to the above aspect, after the terminal voltage of the storage battery has exceeded the first voltage and thus the first charging mode is switched to the second charging mode having a relatively slow charging speed, if the terminal voltage of the storage battery has reduced to be equal to or lower than the the first voltage, or to be equal to or lower than the second voltage which is lower than the first voltage, charging is performed by the first charging mode having a faster charging speed than the second charging mode, until the terminal voltage of the storage battery is restored to the first voltage again. Thus, it is possible to shorten the charging period until the terminal voltage of the storage battery reaches the full-charge voltage. In addition, since a condition (first voltage) for switching from the first charging mode to the second charging mode and a condition (second voltage) for switching from the second charging mode to the first charging mode can be made different from each other, it is possible to avoid occurrence of a phenomenon in which the charging mode is frequently switched around the first voltage.

In the above aspect, the second voltage may be set to be lower than the first voltage.

Such voltage setting makes it possible to more effectively avoid occurrence of a phenomenon in which the charging mode is frequently switched around the first voltage.

Another aspect of the present invention is a charge control method executed by a computer of a vehicle charge system for charging a storage battery, the charge control method including: a step of, after the charging is started, during a period in which terminal voltage of the storage battery is equal to or lower than predetermined first voltage which is lower than full-charge voltage, charging the storage battery by a first charging mode having a predetermined charging speed; a step of, after the terminal voltage of the storage battery has exceeded the first voltage, charging the storage battery by the second charging mode having a predetermined charging speed which is slower than that in the first charging mode; and a step of, after the terminal voltage of the storage battery has exceeded the first voltage, if the terminal voltage of the storage battery has reduced to be equal to or lower than predetermined second voltage which is equal to or lower than the first voltage, charging the storage battery by the first charging mode until the terminal voltage of the storage battery is restored to the first voltage.

In the charge control method according to the above aspect, after the first charging mode is switched to the second charging mode having a relatively slow charging speed, if the terminal voltage of the storage battery has reduced to be equal to or lower than the first voltage, or to be equal to or lower than the second voltage which is lower than the first voltage, charging is performed by the first charging mode having a faster charging speed than the second charging mode, until the terminal voltage of the storage battery is restored to the first voltage again. By such control, it is possible to shorten the charging period until the terminal voltage of the storage battery reaches the full-charge voltage. In addition, since a condition (first voltage) for switching from the first charging mode to the second charging mode and a condition (second voltage) for switching from the second charging mode to the first charging mode can be made different from each other, it is possible to avoid occurrence of a phenomenon in which the charging mode is frequently switched around the first voltage.

The vehicle charge system and the charge control method according to the present invention as described above can prevent prolonging of the charging period until the storage battery reaches a fully charged state.

These and other objects, features, aspects and advantages of the present invention will become more apparent from the following detailed description of the present invention when taken in conjunction with the accompanying drawings.

DESCRIPTION OF THE PREFERRED EMBODIMENTS

Summary

In a vehicle charge system and a charge control method for a vehicle according to the present invention, after the storage amount of a storage battery reaches a predetermined threshold value and the charging speed is switched to low speed, if the storage amount becomes lower than the threshold value, the charging speed is returned to high speed until the storage amount is restored to the threshold value again. Thus, it is possible to shorten the charging period until the storage amount of the storage battery reaches a fully charged state.

[Configuration]

Figure 1:
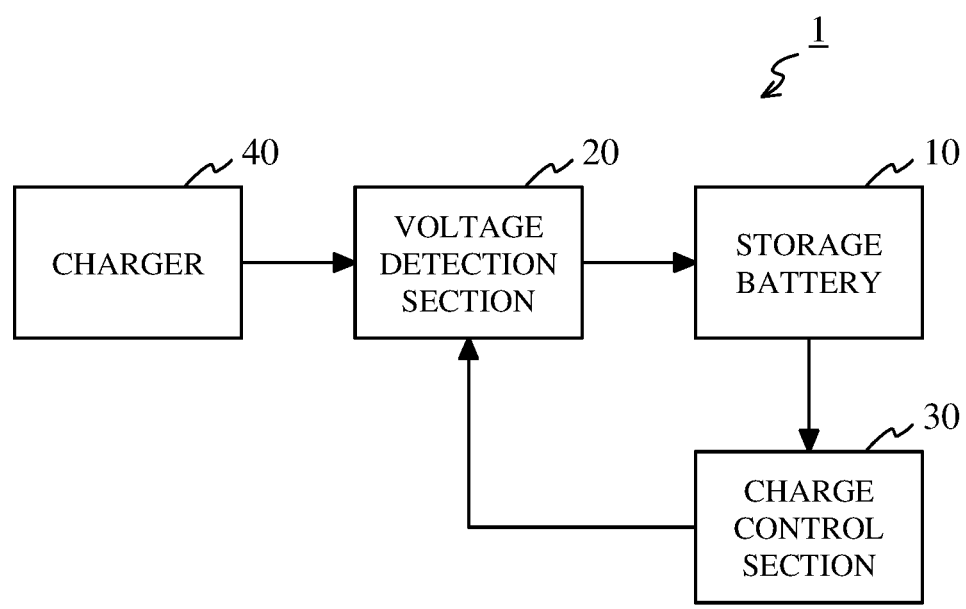
FIG. 1 shows a schematic configuration of a vehicle charge system according to one embodiment of the present invention.

FIG. 1 shows a schematic configuration of a vehicle charge system 1 according to one embodiment of the present invention. The vehicle charge system 1 shown in FIG. 1 includes a storage battery 10, a voltage detection section 20, a charge control section 30, and a charger 40.

The charger 40 is configured to be capable of charging the storage battery 10 via the charge control section 30. As an example, the charger 40 can be configured as a plug-in charger which generates charge power by acquiring a power supply from power supply equipment or the like outside a vehicle via a charging cable (not shown).

The storage battery 10 is a power storing element configured to be chargeable and dischargeable, such as a lithium-ion battery. Other than a lithium-ion battery, various batteries that need to be efficiently charged using two charging modes described later can be applied as the storage battery 10. In the present embodiment, it is assumed that vehicle equipment such as an auxiliary device that consumes power as necessary is connected to the storage battery 10.

The voltage detection section 20 is formed from, for example, a voltage sensor, and is configured to detect terminal voltage V of the storage battery 10. The terminal voltage V of the storage battery 10 detected by the voltage detection section 20 is outputted to the charge control section 30.

The charge control section 30 is configured to be capable of controlling charging of the storage battery 10 on the basis of the terminal voltage V of the storage battery 10 detected by the voltage detection section 20. The charge control section 30 is capable of switching between predetermined first charging mode and second charging mode on the basis of the terminal voltage V of the storage battery 10. The method for switching the charging mode will be described later.

The first charging mode is a mode for performing a charging process of quickly (within a short time) increasing the charge amount of the storage battery 10 at a predetermined charging speed, and is called "normal charging mode", "quick charging mode", etc. In the first charging mode, charging in which the charging speed is prioritized is performed with constant power such as the maximum power that the charger 40 can supply, for example. On the other hand, the second charging mode is a mode for performing a charging process of gradually (over time) increasing the charge amount of the storage battery 10 at a predetermined charging speed slower than that in the first charging mode, and is called "push charging mode", "additional charging mode", etc. In the second charging mode, charging in which avoidance of overvoltage is prioritized is performed with constant power or constant voltage lower than that in the first charging mode.

[Control]

Figure 2:
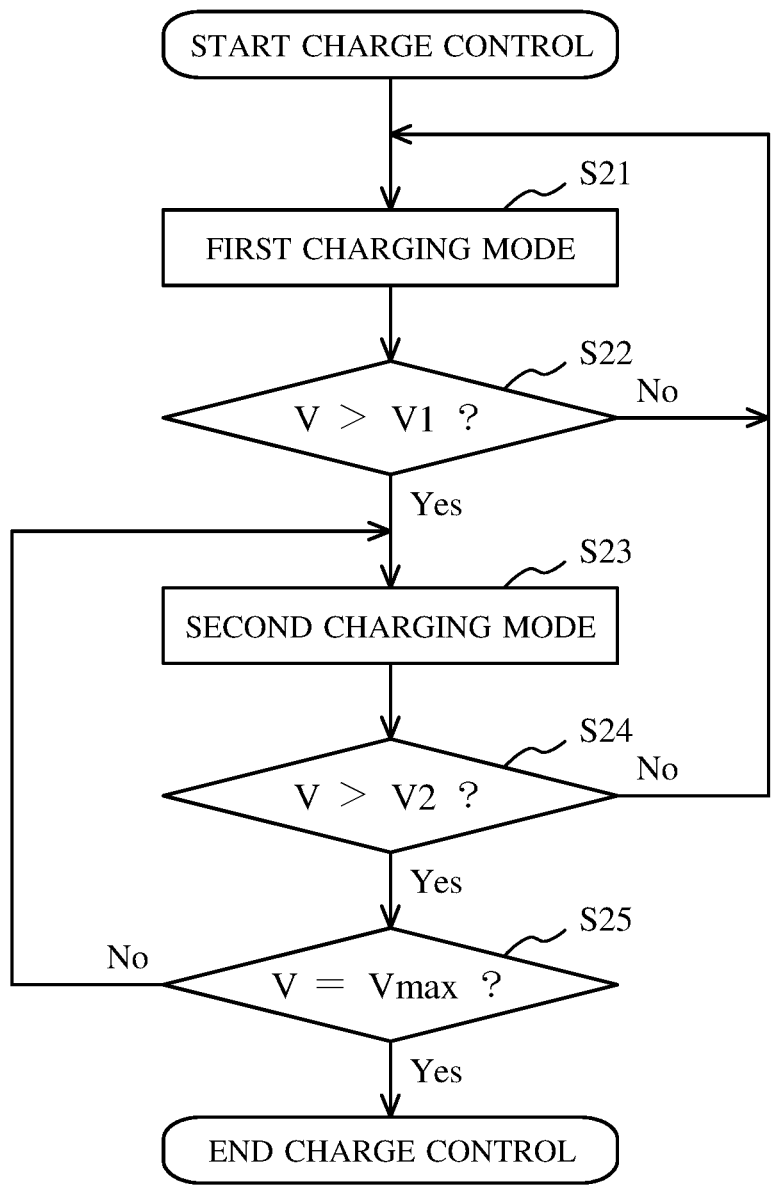
FIG. 2 is a flowchart showing a processing procedure of charge control executed by a charge control section of the vehicle charge system.
Figure 3:
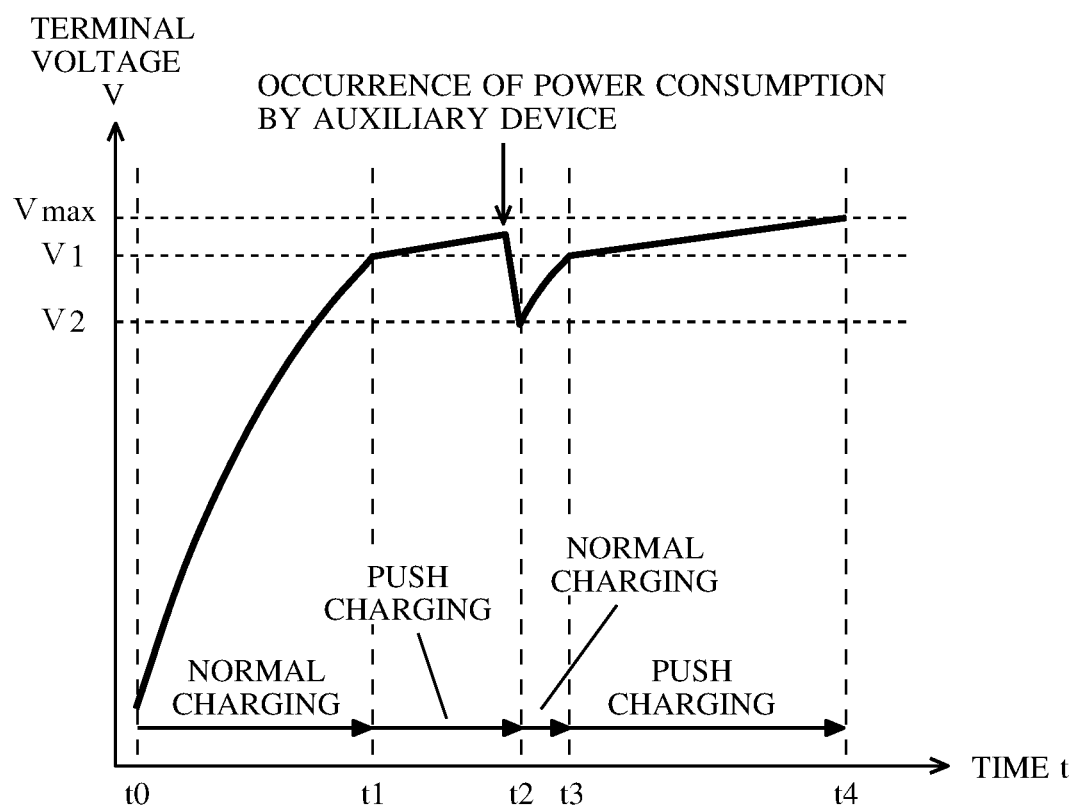
FIG. 3 shows an example of the charge control executed for the storage battery.

Next, with reference to FIG. 2 and FIG. 3, charge control executed by the vehicle charge system 1 according to one embodiment of the present invention will be described. FIG. 2 is a flowchart showing a processing procedure of charge control executed by the charge control section 30 of the vehicle charge system 1. FIG. 3 shows an example of the charge control executed for the storage battery 10. It is noted that, in FIG. 3, a voltage drop variation due to the internal resistance of the storage battery 10, caused along with switching of the charging mode (increase/decrease in charge current), is at such a minute level that the influence thereof on the charge control of the present invention is negligible, and therefore the voltage drop variation is not shown in the drawing.

The charge control shown in FIG. 2 is started by the charger 40 being connected to the vehicle (charge control section 30), for example.

Step S21: The charge control section 30 performs charging (hereinafter, referred to as "normal charging") of quickly increasing the charge amount of the storage battery 10 by the first charging mode (time t0 and time t2 in FIG. 3).

Step S22: The charge control section 30 determines whether or not the terminal voltage V of the storage battery 10 has exceeded predetermined first voltage V1 by the normal charging. The first voltage V1 can be set at appropriate voltage that is smaller than full-charge voltage Vmax (fully charged state) of the storage battery 10 (V1<Vmax). As an example, the first voltage V1 may be set at a value that is 95% of the full-charge voltage Vmax.

During a period in which the terminal voltage V is equal to or smaller than the first voltage V1 without exceeding the first voltage V1 (No in step S22 in FIG. 2), the process returns to step S21 to continue the normal charging by the first charging mode (period of t0≤t<t1 and period of t2≤t<t3 in FIG. 3). On the other hand, if the terminal voltage V exceeds the first voltage V1 (Yes in step S22 in FIG. 2, time t1 and time t3 in FIG. 3), the process proceeds to step S23.

Step S23: Since the terminal voltage V has exceeded the first voltage V1, the charge control section 30 switches the charging mode from the first charging mode to the second charging mode, to perform charging (hereinafter, referred to as "push charging") of gradually increasing the charge amount of the storage battery 10 by the second charging mode (time t1 and time t3 in FIG. 3).

Step S24: In the case where the terminal voltage V becomes lower than the first voltage V1 for any reason during the push charging, the charge control section 30 determines whether or not the terminal voltage V of the storage battery 10 has not reduced to predetermined second voltage V2 or lower. As a reason for reduction of the terminal voltage V during the push charging, for example, it is conceivable that power is taken out by operation of the auxiliary device connected to the storage battery 10. The second voltage V2 can be set at any voltage that is lower than the above first voltage V1 (V2<V1). For example, the second voltage V2 may be set at a value that is 90% of the full-charge voltage Vmax.

If the terminal voltage V has reduced to the second voltage V2 or lower during the push charging (No in step S24 in FIG. 2, time t2 in FIG. 3), the process returns to step S21 so that the charging mode is switched from the second charging mode to the first charging mode and the normal charging by the first charging mode is performed again (period of t2≤t<t3 in FIG. 3). On the other hand, if the terminal voltage V has not reduced to the second voltage V2 or lower (Yes in step S24 in FIG. 2), the process proceeds to step S25.

Step S25: The charge control section 30 determines whether or not the terminal voltage V of the storage battery 10 has reached the full-charge voltage Vmax during the push charging.

If the terminal voltage V of the storage battery 10 has not reached the full-charge voltage Vmax during the push charging (No in step S25 in FIG. 2), the process returns to step S23 to continue the push charging by the second charging mode (period of t1≤t<t2 and period of t3≤t<t4 in FIG. 3). On the other hand, if the terminal voltage V of the storage battery 10 has reached the full-charge voltage Vmax (Yes in step S25 in FIG. 2, time t4 in FIG. 3), the charge control is ended.

Operation and Effect in the Present Embodiment

As described above, in the vehicle charge system 1 and the charge control method according to one embodiment of the present invention, after the terminal voltage V of the storage battery 10 has exceeded the first voltage V1 and thus the charging mode is switched from the first charging mode having a faster charging speed to the second charging mode having a slower charging speed, if the terminal voltage V of the storage battery 10 has reduced to be equal to or lower than the second voltage V2 which is lower than the first voltage V1, charging is performed by the first charging mode having a faster charging speed until the terminal voltage V of the storage battery 10 is restored to the first voltage V1 again. Such control can shorten the charging period until the terminal voltage V of the storage battery 10 reaches the full-charge voltage Vmax.

In addition, in the vehicle charge system 1 and the charge control method according to the present embodiment, the first voltage V1 which is a condition for switching from the first charging mode to the second charging mode, and the second voltage V2 which is a condition for switching from the second charging mode to the first charging mode, are different from each other. Therefore, it is possible to avoid occurrence of a phenomenon in which the charging mode is frequently switched around the first voltage V1.

[Applications]

Figure 4:
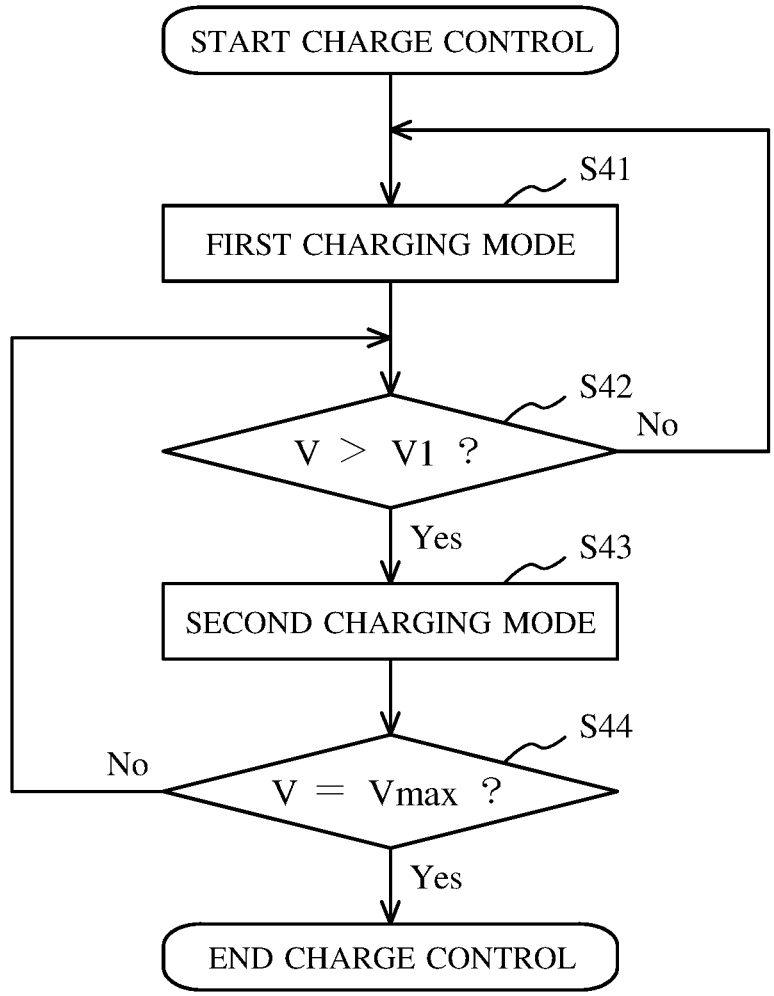
FIG. 4 is a flowchart showing a processing procedure of charge control in an application, executed by the charge control section of the vehicle charge system.

In the charge control described in the above embodiment, in the case where the terminal voltage V reduces during the push charging, processing of switching the second charging mode to the first charging mode is performed after waiting until the terminal voltage V becomes equal to or lower than the second voltage V2 (step S24 in FIG. 2), thereby avoiding occurrence of a phenomenon in which the charging mode is frequently switched around the first voltage V1. However, if there is no possibility that the charging mode is frequently switched around the first voltage V1, as shown in a flowchart in FIG. 4, the second charging mode may be immediately switched to the first charging mode at a time when it is detected that the terminal voltage V has become equal to or lower than the first voltage V1 (step S42 in FIG. 4) (that is, V1=V2).

Other than power supply equipment for performing plug-in charging via a charge cable, the charger 40 described in the above embodiment may be a non-contact charger embedded in a road surface for realizing charging during travelling of the vehicle, for example.

The charge control performed by the charge control section 30 as described in the above embodiment may be implemented as hardware by a dedicated circuit, or may be implemented as software in such a manner that a computer including a processor and the like reads and executes a predetermined program stored in a memory (ROM, RAM).

While the invention has been described in detail, the foregoing description is in all aspects illustrative and not restrictive. It will be understood that numerous other modifications and variations can be devised without departing from the scope of the invention.

What is claimed is:

1. A vehicle charge system for charging a storage battery configured to supply power to an auxiliary device, the vehicle charge system comprising:

a charger configured to perform plug-in charging to the storage battery while being connected to a vehicle via a charging cable, or a charger configured to perform non-contact charging to the storage battery while being connected to the vehicle in a non-contact manner;

a voltage detection section configured to detect terminal voltage of the storage battery; and a charge control section configured to:

control charging of the storage battery until the terminal voltage of the storage battery reaches a third voltage at which the storage battery is in a fully charged state, while switching between a first charging mode in which the charging is performed with first power suppliable to the system and a second charging mode in which the charging is performed with second power which is constant and lower than the first power, based on the terminal voltage of the storage battery;

after the charging is started with the charger being connected to the vehicle, during a period in which the terminal voltage of the storage battery is equal to or lower than a first voltage which is lower than the third voltage, charge the storage battery by the first charging mode;

after the terminal voltage of the storage battery has exceeded the first voltage, charge the storage battery by the second charging mode;

during charging of the storage battery by the second charging mode, when the terminal voltage of the storage battery has reduced to equal to or lower than a second voltage which is lower than the first voltage, along with power consumption including an operation of the auxiliary device, charge the storage battery by the first charging mode until the terminal voltage of the storage battery is restored to the first voltage; and after the terminal voltage of the storage battery has been restored to and exceeded the first voltage, charge the storage battery by the second charging mode until the terminal voltage of the storage battery reaches the third voltage.

2. A charge control method executed by a computer of a vehicle charge system for charging a storage battery configured to supply power to an auxiliary device, the vehicle charging system including a charger configured to perform plug-in charging to the storage battery while being connected to a vehicle via a charging cable, or a charger configured to perform non-contact charging to the storage battery while being connected to the vehicle in a non-contact manner, the charge control method comprising:

after the charging is started with the charger being connected to the vehicle, during a period in which terminal voltage of the storage battery is equal to or lower than a first voltage which is lower than a third voltage at which the storage battery is in a fully charged state, charging the storage battery by a first charging mode in which charging is performed with first power suppliable by the system;

after the terminal voltage of the storage battery has exceeded the first voltage, charging the storage battery by a second charging mode in which charging is performed with second power which is constant and lower than the first power;

during charging of the storage battery by the second charging mode, when the terminal voltage of the storage battery has reduced to equal to or lower than a second voltage which is lower than the first voltage, along with power consumption including an operation of the auxiliary device, charging the storage battery by the first charging mode until the terminal voltage of the storage battery is restored to the first voltage; and after the terminal voltage of the storage battery has been restored to and exceeded the first voltage, charging the storage battery by the second charging mode until the terminal voltage of the storage battery reaches the third voltage.

* * * * *